US011909732B1

(12) United States Patent
Mitchell

(10) Patent No.: US 11,909,732 B1
(45) Date of Patent: Feb. 20, 2024

(54) PASSWORD STORAGE IN A VIRTUAL ENVIRONMENT

(71) Applicant: Intuit Inc., Mountain View, CA (US)

(72) Inventor: Michael William Mitchell, Santa Cruz, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/228,565

(22) Filed: Jul. 31, 2023

(51) Int. Cl.
G06F 3/14 (2006.01)
H04L 9/40 (2022.01)
H04L 67/131 (2022.01)

(52) U.S. Cl.
CPC .......... H04L 63/083 (2013.01); H04L 67/131 (2022.05)

(58) Field of Classification Search
CPC ...... G06V 20/20; G06V 10/255; G06V 10/95; G06V 10/82; G06V 20/60; G06F 16/24578; G06N 5/022; G06N 20/00; H04L 67/131; H04L 63/083
USPC .......................................................... 726/7
See application file for complete search history.

(56) References Cited

U.S. PATENT DOCUMENTS

2021/0042830 A1* 2/2021 Burke .................. G06Q 20/384
2023/0168786 A1* 6/2023 Mantri ................ G06F 16/9537
715/740

* cited by examiner

*Primary Examiner* — Jeffrey C Pwu
*Assistant Examiner* — Nega Woldemariam
(74) *Attorney, Agent, or Firm* — Paradice & Li LLP

(57) ABSTRACT

A server computer hosting an extended reality world receives a first transmission over a communication network from a computing device associated with a user, the first transmission including a request for the user to access the extended reality world. The server computer transmits a presentation of the extended reality world to the communication device over the communications network based at least in part on the request, and displays the presentation of the extended reality world on the computing device, where the presentation includes at least an avatar associated with the user. The server computer receives a command for the avatar to store a phrase selected by the user in a location associated with a virtual object within the extended reality world. The server computer displays, within the presentation of the extended reality world on the computing device, the avatar storing the phrase at the location in the extended reality world.

16 Claims, 10 Drawing Sheets

PASSWORD STORAGE IN A VIRTUAL ENVIRONMENT

TECHNICAL FIELD

This disclosure generally relates to virtual environments, and more specifically, to storing a phrase (such as a password or other sensitive phrase or code) within a virtual reality world, augmented reality world, or mixed reality world.

DESCRIPTION OF RELATED ART

Many computing devices, communication devices, online resources, databases, and employer-operated network systems require a security code or a combination of a username and password for user access. For example, smartphones typically require users to enter the correct PIN or passcode to unlock, access, and thereafter use the smartphones. Similarly, online resources (such as online banking sites and online trading sites) typically require users to enter the correct username and password combination to log into and access their respective resources. Although these security mechanisms improve security, reduce unauthorized access, and deter theft, users are required to remember or store these PINs, passcodes, usernames, and passwords for an ever-increasing number of devices and resources. Many of these security mechanisms require users to periodically change their PINs, passcodes, and/or passwords—and frequently preclude users from recycling old or previously-used PINs, passcodes, and/or passwords.

As the number of PINs, passcodes, usernames, and/or passwords employed by a respective user increases, so does the difficulty with which the respective user is able to remember or securely store them. In some instances, users may forget one or more of their respective PINs, passcodes, usernames, and/or passwords and thereafter need assistance to recover or reset them. In other instances, users may write their PINs, passcodes, usernames, and/or passwords in a notepad or on post-it notes that can be easily obtained by others. Therefore, there is a need for a convenient yet secure mechanism through which users can store their PINs, passcodes, usernames, passwords, and/or other sensitive phrases.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method performed by a server computer associated with an extended reality world. In some implementations, the method includes receiving a first transmission over a communication network from a computing device associated with a user, the first transmission including a request for the user to access the extended reality world. The method includes transmitting a presentation of the extended reality world over the communications network to the computing device based at least in part on the request, and displaying the presentation of the extended reality world on the computing device associated with the user. In some instances, the presentation includes at least an avatar associated with the user. The method includes receiving a command for the avatar to store a phrase selected by the user in a place associated with a virtual object within the extended reality world and storing the phrase in memory corresponding to the place associated with the virtual object. The method also includes displaying, within the presentation of the extended reality world on the computing device, the avatar storing the phrase in the virtual object. In some aspects, the avatar stores the phrase in the place associated with the virtual object in a manner that is not visible to other users of the extended reality world.

In some aspects, the phrase includes one or more of a username, a password, an access code, an encryption key, a decryption key, a digital currency key, a favorite word, or a favorite phrase. In other aspects, the phrase is a recovery phrase associated with a cryptocurrency or digital ID wallet, the recovery phrase includes a plurality of words arranged in a predetermined order, and each word is spelled based on a respective predefined spelling. In some other aspects, the extended reality world includes an online game, and the avatar includes a player that is admitted to the online game and controlled by the user.

In some instances, displaying the avatar storing the phrase includes displaying the avatar placing a virtual note indicating the phrase within an interior area or volume of the virtual object, and the method also includes restricting user access to the virtual note based on a predetermined manner of unfolding or unlocking the virtual note. In other instances, displaying the avatar storing the phrase includes displaying the avatar writing, drawing, or marking the phrase on one or more surfaces of the virtual object, and the method also includes restricting user access to the virtual object based on one or more of a gesture, a song, a phrase, a sound, a movement, or a sequence of actions. In some other instances, displaying the avatar storing the phrase includes displaying the avatar storing the phrase on top of, underneath, behind, or within a certain distance and/or direction of the virtual object, and the method also includes restricting user access to the virtual object based on one or more of a gesture, a song, a phrase, a sound, a movement, or a sequence of actions.

In some implementations, the method also includes determining that another user has located the place in which the selected phrase is stored and transmitting, to the computing device over the communications network, an indication that the other user located the place in which the selected phrase is stored. The method may also include determining that the other user has retrieved the selected phrase from the place associated with the virtual object and transmitting, to the computing device over the communications network, an indication that the other user retrieved the selected phrase from the place associated with the virtual object.

In various aspects, the method may also include encoding a location of the virtual object as a 3-word mapping and transmitting a link of the 3-word mapping over the communication network to another user of the virtual reality world. The method may also include receiving an indication that the other user executed the link and granting the other user access to the virtual object based on the received indication.

Another innovative aspect of the subject matter described in this disclosure can be implemented in a server computer associated with an extended reality world. The server computer can include one or more processors and a memory communicatively coupled with the one or more processors. The memory stores instructions that, when executed by the one or more processors, causes the server computer to receive a first transmission over a communication network from a computing device associated with a user, the first transmission including a request for the user to access the extended reality world. Execution of the instructions causes the server system to transmit a presentation of the extended reality world over the communications network to the computing device based at least in part on the request, and to display the presentation of the extended reality world on the computing device. In some aspects, the presentation includes at least an avatar associated with the user. Execution of the instructions causes the server system to receive a command for the avatar to store a phrase selected by the user in a place associated with a virtual object within the extended reality world, and to store the phrase in memory corresponding to the place associated with the virtual object. Execution of the instructions causes the server computer to display, within the presentation of the extended reality world on the computing device, the avatar storing the phrase in the virtual object. In some aspects, the avatar stores the phrase in the place associated with the virtual object in a manner that is not visible to other users of the extended reality world.

In some aspects, the phrase includes one or more of a username, a password, an access code, an encryption key, a decryption key, a digital currency key, a favorite word, or a favorite phrase. In other aspects, the phrase is a recovery phrase associated with a cryptocurrency or digital ID wallet, the recovery phrase includes a plurality of words arranged in a predetermined order, and each word is spelled based on a respective predefined spelling. In some other aspects, the extended reality world includes an online game, and the avatar includes a player that is admitted to the online game and that is controlled by the user.

In some instances, displaying the avatar storing the phrase includes displaying the avatar placing a virtual note indicating the phrase within an interior area or volume of the virtual object, and execution of the instructions also causes the server computer to restrict user access to the virtual note based on a predetermined manner of unfolding or unlocking the virtual note. In other instances, displaying the avatar storing the phrase includes displaying the avatar writing, drawing, or marking the phrase on one or more surfaces of the virtual object, and execution of the instructions also causes the server computer to restrict user access to the virtual object based on one or more of a gesture, a song, a phrase, a sound, a movement, or a sequence of actions. In some other instances, displaying the avatar storing the phrase includes displaying the avatar storing the phrase on top of, underneath, behind, or within a certain distance and/or direction of the virtual object, and execution of the instructions also causes the server computer to restrict user access to the virtual object based on one or more of a gesture, a song, a phrase, a sound, a movement, or a sequence of actions.

In some implementations, execution of the instructions may also cause the server computer to determine that another user has located the place in which the selected phrase is stored and transmit, to the computing device over the communications network, an indication that the other user located the place in which the selected phrase is stored. Execution of the instructions also causes the server computer to determine that the other user has retrieved the selected phrase from the place associated with the virtual object and transmit, to the computing device over the communications network, an indication that the other user retrieved the selected phrase from the place associated with the virtual object.

In various aspects, execution of the instructions also causes the server system to encode a location of the virtual object as a 3-word mapping, and to transmit a link of the 3-word mapping over the communication network to another user of the virtual reality world. Execution of the instructions may also cause the server system to receive an indication that the other user executed the link, and to grant the other user access to the virtual object based on the received indication.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
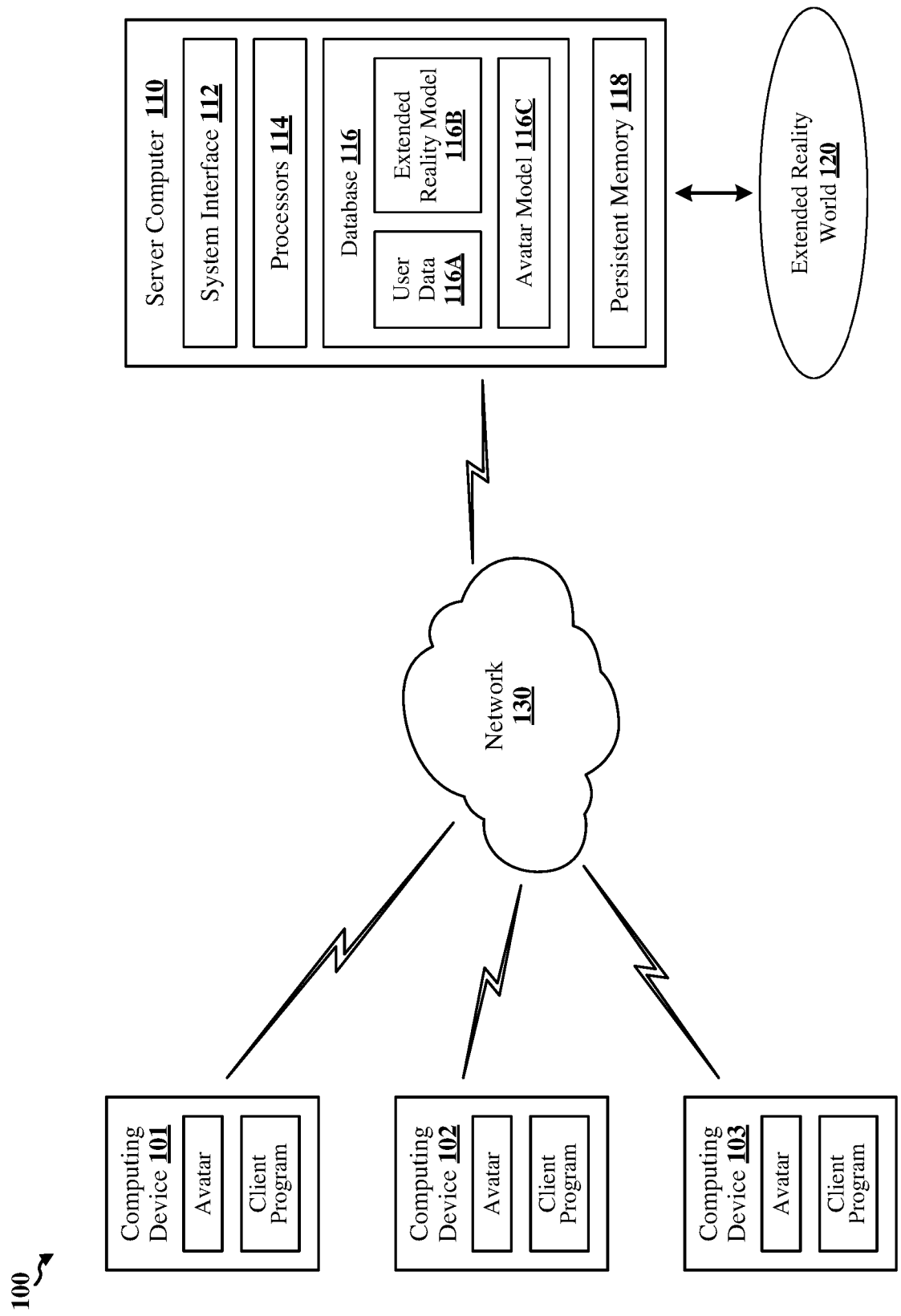
FIG. 1 shows an example network environment within which various aspects of the subject matter disclosed herein can be implemented.

Implementations of the subject matter described in this disclosure allow a user to access, navigate, and interact with a virtual reality world, an augmented reality world, or a mixed reality world. In various aspects, implementations of the subject matter disclosed herein allow a user to conveniently store a password, PIN, or other sensitive phrase within the extended reality world. Virtual reality (VR) is a fully immersive digital environment in which the physical world is replaced with a virtual reality world and presented to a user on a display screen (such as a video monitor) or a peripheral device (such as a VR headset). A user may be represented in the virtual reality world as an avatar that can move throughout the virtual reality world, interact with other users' avatars, and build or create virtual objects (among other examples) based on commands, gestures, and other instructions provided by the user. Augmented reality (AR) presents a live view of a physical or "real-world" environment to a user in which certain elements or aspects of the physical environment are "augmented" by computer-generated elements or aspects. Thus, while virtual reality replaces a physical environment with a virtual environment, augmented reality supplements a user's physical surroundings by overlaying virtual objects on the user's physical surroundings. Mixed reality, which may be described as a mix of actual reality and virtual reality, produces new environments and visualizations in which physical objects and virtual objects co-exist and can interact with each other in real-time. These three types of computer-generated or computer-aided realities may be collectively referred to as extended reality (ER).

Aspects of the present disclosure allow a user of an extended reality world to "virtually" store a phrase in a selected location associated with a virtual object within the extended reality world. As used herein, the phrase may be any word, phrase, sentence, name, number, or other sequence of characters (including but not limited to alphanumeric characters, punctuations, symbols, mathematical operators, or special characters, among other examples). For example, in various aspects, the phrase may include one or more of a username, a password, an access code, an encryption key, a decryption key, a digital currency key, a favorite word, a favorite phrase, or a recovery phrase or code (such as those associated with a cryptocurrency or digital identification (ID) wallet), among other examples. In some implementations, a server computer that hosts or that is otherwise associated with the extended reality world can store the phrase in persistent memory while also displaying the user's avatar storing the phrase in the selected location within the extended reality world, thereby ensuring that the user's phrase is safely stored and can be subsequently retrieved by the user.

In some instances, the server computer may display the avatar placing a virtual note indicating the phrase within an interior area or volume of the virtual object, and the server computer may restrict user access to the virtual note based on a predetermined manner of unfolding or unlocking the virtual note. In other instances, the server computer may display the avatar writing the phrase on one or more surfaces of the virtual object or may display the avatar storing the phrase on top of, underneath, behind, or within a certain distance and/or direction of the virtual object. Thereafter, the server computer may restrict user access to the virtual object based on one or more of a gesture, a song, a phrase, a sound, a movement, or a sequence of actions made by the avatar.

By allowing users of an extended reality world to store phrases in locations associated with virtual objects within the extended reality world, aspects of the present disclosure can retain the phrases, on behalf of the users, in a manner that maintains secrecy of the phrases without requiring the users to remember or store their respective phrases in the physical world. In this way, aspects of the present disclosure may reduce risks associated with forgetting and/or misplacing passwords, PINs, and other sensitive phrases. Moreover, the ability of users to store phrases at selected locations within the extended reality world may further reduce the risk of such phrases being compromised because the selected locations in the extended reality world, as well as the identity of the extended reality world itself, are known only by the respective users. In other words, since a potential thief would need to know not only the particular extended reality world within which a user's phrase is stored but also the specific location within that particular extended reality world at which the user's phrase is stored, it would be very difficult, if not impossible, for the potential thief to locate and obtain the user's phrase from the extended reality world.

Aspects of the subject matter disclosed herein are not a mental process that can be performed in the human mind, for example, because the human mind is not capable of implementing an extended reality world, let alone an extended reality world in which an avatar associated with a user can store a user-selected phrase in a virtual place within the extended reality world. Nor is the human mind capable of storing the user-selected phrase in persistent memory associated with the extended reality world. The human mind is not equipped to practically transmit and receive information associated with the extended reality world to and from user computing devices over a communications network. Moreover, the human mind is neither equipped to nor capable of displaying a presentation of the extended reality world on user computing devices, let alone displaying the avatar storing the phrase at a selected location within the extended reality world. Aspects of the subject matter disclosed herein are not a method of organizing human activity because the claims of this patent application do not recite any fundamental economic practice, commercial interaction, legal interaction, or business relations. Moreover, various aspects of the present disclosure provide a technical solution to a technical problem that is rooted in computer technology, namely, providing a secure storage medium within which users can store PINs, usernames, passwords, encryption keys, and/or other phrases needed by the users to log into or otherwise access various digital devices and online resources.

Aspects of the subject matter disclosed herein are not a mental process that can be performed in the human mind, for example, because the human mind is not capable of implementing an extended reality world in which an avatar associated with a user of the extended reality world stores a user-selected phrase in a virtual place within the extended reality world while also storing the user-selected phrase in persistent memory. Nor is the human mind equipped to practically transmit and receive information associated with the extended reality world over a communications network. Similarly, the human mind is neither equipped to nor capable of displaying a presentation of the extended reality world on a computing device associated with the user, let alone displaying the avatar storing the phrase in the virtual place within the extended reality world. Aspects of the subject matter disclosed herein are not a method of organizing human activity because the claims of this patent application do not recite any fundamental economic practice, commercial interaction, legal interaction, or business relations. Moreover, various aspects of the present disclosure provide a technical solution to a technical problem that is rooted in computer technology, namely, providing a secure storage medium for user-selected phrases while minimizing risks associated with forgotten or misappropriated user-selected phrases.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing, and other symbolic representations of operations on data bits within a computer memory.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows an example network environment 100 within which aspects of the present disclosure can be implemented. Network environment 100 is shown to include three computing devices 101-103, a server computer 110, an extended reality world 120, and a communications network 130. Although only three computing devices 101-103 are shown in the example of FIG. 1, in other implementations, any suitable number of computing devices can access and communicate with the server computer 110 over the communications network 130. In addition, although the example of FIG. 1 depicts the computing devices 101-103 accessing the extended reality world 120 via the server computer 110, other implementations may allow the computing devices 101-103 to directly access the extended reality world 120 over the communications network 130. Although described in the context of extended reality world 120, various implementations of the subject matter disclosed herein can be equally applied to virtual reality worlds, augmented reality worlds, and mixed reality worlds.

The computing devices 101-103 can be any suitable wired or wireless computing device that can access and communicate with the server computer 110 (or the extended reality world 120) over the communications network 130. The computing devices 101-103 can be a desktop computer, laptop computer, tablet computer, personal digital assistant, cellular telephone, smartphone, electronic book reader, or other suitable device capable of communicating with the extended reality system 110. Although not shown in FIG. 1 for simplicity, each of the computing devices 101-103 includes at least a processor, a memory storing programs and other instructions that can be executed by the processor, and a user interface through which a respective user can access, communicate with, and interact with the extended reality world 120 via the server computer 110. The user interface can include one or more of a display screen, an audio interface, an ER headset, a head-mounted display (HMD), a haptic interface, a motion-detection interface, a keyboard, a trackpad, a trackball, or a mouse, among other examples.

In some aspects, the user interface may be one or more of Facebook's Oculus, Samsung's Gear, Google's Cardboard, or Apple's VisionPro, among other examples. For purposes of discussion herein, the first computing device 101 is associated with a first user and may store avatar information for the first user, the second computing device 102 is associated with a second user and may store avatar information for the second user, and the third computing device 103 is associated with a third user and may store avatar information for the third user. That is, the first user can access and participate in the extended reality world 120 as a corresponding first avatar using the first computing device 101, the second user can access and participate in the extended reality world 120 as a corresponding second avatar using the second computing device 102, and the third user can access and participate in the extended reality world 120 as a corresponding third avatar using the third computing device 103.

In the example of FIG. 1, each of the computing devices 101-103 includes an avatar engine and a client program. The avatar engine can be used to select or create an avatar associated with a user of the respective computing device, and in some aspects, can be used to render and manipulate the avatar within the extended reality world 120. The avatars may take various forms including (but not limited to) a human, an animal, or a character, among other examples. In some aspects, each user can customize various aspects of its avatar, for example, to resemble the user as he or she appears in the physical real world or to resemble another person, character, or life-form as they may appear in the physical world. Each user can have multiple avatars, but typically uses only one avatar at a time for participation in the extended reality world 120.

Although not shown for simplicity, each of the computing devices 101-103 may include one or more sensors such as (but not limited to) cameras, gyroscopes, magnetometers, and accelerometers, among other examples. These sensors can detect, track, and/or interpret various positions, orientations, movements, gestures, gazes, and other actions of their respective users in the physical world. In some instances, signals from the sensors can be used to manipulate or control the position, orientation, movements, gestures, gazes, and other actions of a respective avatar within the extended reality world 120. For example, when the first user is wearing an HMD and tilts his or her head, the HMD can detect the position, orientation, and movement of the user's head and send control information over the communications network 130 to the server computer 110, which in response thereto can cause the user's avatar to tilt its head in a manner that mirrors the user's head tilt.

The client program can render a user's avatar in the extended reality world 120 and works in conjunction with the user interface to allow the user to control or manipulate the avatar's movements, actions, and other activities within the extended reality world 120. For example, by employing the client program and the user interface, the user can present the avatar in the extended reality world 120, cause the avatar to travel throughout the extended reality world 120, cause the avatar to interact with other users' avatars in the extended reality world 120, and cause the avatar to store a phrase in the extended reality world 120, among other examples. More generally, the avatars can build, create, buy, sell, and/or trade virtual objects and services with each other in the extended reality world 120, and can store phrases in various places or locations corresponding to these virtual objects within the extended reality world 120. In some aspects, the client program allows a user to obtain virtual objects created by other users and thereafter modify and/or assemble the obtained virtual objects to create new virtual objects.

In some implementations, the client program can construct a presentation of the extended reality world 120 based on data extracted from transmissions by the server computer 110 over the communications network 130. The client program can display the user's avatar within the constructed presentation of the extended reality world 120 and can maneuver the avatar and cause the avatar to perform actions (such as storing a phrase at a selected location within the extended reality world 120) based on control signals and/or commands provided by the user via one or more user interfaces.

The server computer 110 may include one or more servers such as (but not limited to) a web server, a news server, a file server, an application server, a database server, a proxy server, or any other server suitable for performing functions or processes described herein. Each server may be a unitary server or a distributed server spanning multiple computers or multiple datacenters, and may include hardware, software, or embedded logic components or a combination of two or more such components for carrying out the appropriate functionalities implemented or supported by the server. Each server may include one or more processors (not shown for simplicity) capable of executing scripts or instructions of one or more software programs stored in an associated memory. In addition, or in the alternative, the processors may be or may include any number of Application Specific Integrated Circuits (ASICs), Field Programmable Gate Arrays (FPGAs), or Programmable Logic Devices (PLDs). In some instances, the servers may include individual application server modules (not shown for simplicity) that can implement functionalities associated with assorted services and features of the extended reality world 120. In other instances, the servers may be a distributed cloud computing solution such as (but not limited to) a local or on-premises software solution, a Content as a Service (CaaS), Digital Content as a Service (DCaaS), Software as a Service (SaaS), Managed Software as a Service (MSaaS), Platform as a Service (PaaS), Desktop as a Service (DaaS), Framework as a Service (FaaS), Backend as a Service (BaaS), Mobile Backend as a Service (MBaaS), or Infrastructure as a Service (IaaS), among other examples.

In the example of FIG. 1, the server computer 110 is shown to include a system interface 112, one or more processors 114, a database 116, and a persistent memory 118. The server computer 110 can use any suitable data structures, file formats, and schemas to send data to or receive data from the computing devices 101-103. Example data structures and file formats may include (but are not limited to) JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), Augmented Reality Markup Language 2.0 (ARML 2.0), Geography Markup Language (GML), or any other functionally similar representations either alone or in combination with one another. Alternatively, proprietary data structures, file formats, and schemas may be used, either exclusively or in combination with known or open standards.

The system interface 112 can include any suitable devices or components that allow the server computer 110 to authenticate users associated with computing devices (such as computing devices 101-103) and thereafter access and participate in the extended reality world 120. For example, system interface 112 may receive requests from computing devices 101-103 for their respective users to login to the extended reality world 120. The requests, which can be Hyper-Text Transfer Protocol (HTTP) requests, Application Program Interface (API) requests, or other web-based requests, may include user credentials such as (but not limited to) a username and password combination. Once a user is authenticated, the system interface 112 can facilitate communications between the extended reality world 120 and the authenticated user over the communications network 130. The system interface 112 also allows the user to provide various control signals and commands for controlling the movements, actions, and other activities of the user's avatar to the server computer 110 over the communications network 130. In some aspects, the system interface 112 may also be used to exchange data, instructions, and other information with the extended reality world 120.

Processors 114 may be one or more suitable processors capable of executing scripts or instructions of one or more software programs stored in the database 116 or persistent memory 118. The processors 114 can be implemented with a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processors 114 can be implemented as a combination of computing devices (such as a combination of a DSP and a microprocessor, a plurality of microprocessors, one or more microprocessors in conjunction with a DSP core, or any other such configuration). In some instances, one or more of the processors 114 may be a graphics processing unit (GPU) or other specialized processor designed to process data for analysis according to one or more machine learning modules. In some aspects, the GPU may have a parallel structure configured for parallel processing of large blocks of data such as, for example, mathematically intensive data including Advanced Premium Tax Credit (APTC) or Bayesian learning-type calculations.

The database 116 stores information pertaining to the extended reality world 120, information pertaining to users of the extended reality world 120, information pertaining to avatars associated with the user, information pertaining to virtual objects created within the extended reality world 120, and other information associated with providing users with immersive experiences in the extended reality world 120. In some instances, database 116 can be a relational database capable of manipulating any number of various data sets using relational operators. The database 116 can also use Structured Query Language (SQL) for querying and maintaining the database, and information stored in the database 116 can be arranged in tabular form, either collectively in a feature table or individually within each of the data sets.

In the example of FIG. 1, database 116 is shown to include user data 116A, an extended reality model 116B, and an avatar model 116C. The user data 116A may include profile information for users of the extended reality world 120. In various aspects, when a person initially registers to become a user of the extended reality world 120, the person may be prompted to provide personal information including (but not limited to) name, age, gender, birthday, email address, user preferences, avatar parameters, gaming preferences, extended reality world preferences, educational history, work history, or other personal attributes, among other examples. In some implementations, user data 116A may also include location information of users of the extended reality world 120. For example, in some aspects, the location information of a respective user may include a geographic location for each device employed by the respective user to access and/or communicate with the extended reality world 120. The location information may include the location of a stationary computing device (e.g., a desktop computer or workstation) with which the respective user has accessed the extended reality world 120 as well as the location of each mobile communication device with which the respective user has accessed the extended reality world 120.

In the example of FIG. 1, database 116 is shown to include user data 116A, an extended reality model 116B, and an avatar model 116C. The user data 116A may include profile information for users of the extended reality world 120. In various aspects, when a person initially registers to become a user of the extended reality world 120, the person may be prompted to provide personal information including (but not limited to) name, age, birthday, email address, gender, avatar parameters, favorite extended reality world, preferred extended reality platform, favorite games, preferred gaming platform, educational history, work history, characteristics, or personal attributes, among other examples. In some implementations, user data 116A may also include location information of users of the extended reality world 120. For example, in some aspects, the location information of a respective user may include a geographic location for each device employed by the respective user to access and/or communicate with the extended reality world 120. The location information may include the location of a stationary computing device (e.g., a desktop computer or workstation) with which the respective user has accessed the extended reality world 120 as well as the location of each mobile communication device with which the respective user has accessed the extended reality world 120. After the person becomes a registered user, user data 116A may also include or store user credentials (such as a username/password, a recovery key, and payment information, among other examples).

The extended reality model 116B may include processors, machine learning modules, and/or artificial intelligence (AI) systems that can render the extended reality world 120 and transmit a presentation of the extended reality world 120 over the communications network 130 to computing devices 101-103. The extended reality model 116B can receive transmissions of avatars, avatar control signals, and commands from the computing devices 101-103 and can display the users' avatars, along with any associated movements, actions, and/or other activities embodied in the avatar control signals and commands, within the presentation of the extended reality world 120. In some aspects, the extended reality model 116B simulates the experience of traveling in the extended reality world 120 by presenting the extended reality world 120 from the perspective of the users' avatars, for example, in a first-person view (FPV) manner.

More specifically, the extended reality model 116B works in conjunction with the client programs installed on the computing devices 101-103 to render a FPV of the extended reality world 120 based on the positions, orientations, and movements of the respective avatars. The extended reality model 116B and the client program also work in conjunction with each other to display the presentation of the extended reality world 120 to users via user interfaces associated with computing devices 101-103. In some instances, the extended reality world 120 presented by the extended reality model 116B may include or resemble a portion of the physical world as seen on Earth. In some aspects, the presentation may include a live stream of one or more portions of the physical world. In other instances, the extended reality world 120 presented by the extended reality model 116B may include users' avatars overlaid on a portion of the physical world using suitable AR techniques.

The avatar model 116C may include processors, machine learning modules, and/or AI systems that can create avatars for users of the extended reality world 120. In some instances, the avatar model 116C may use a Convolution Neural Network (CNN) to generate a unique avatar for each user based on the respective user's profile information. The avatar model 116C can render the avatars in the extended reality world 120, and can control the avatars' movement, actions, and other activities within the extended reality world 120 based on control signals and/or commands provided by the users. As discussed, the avatars may take various forms including (but not limited to) a human, a humanoid, a character, or a graphic image, among other examples. In some implementations, the avatar model 116C may also store the virtual location and orientation of users' avatars in the extended reality world 120.

The persistent memory 118, which may include any suitable non-volatile such as (but not limited to) EPROM, EEPROM, Flash memory, or hard drives, among other examples, can store any number of software programs, executable instructions, machine code, and/or algorithms that, when executed by the processors 114, causes the server computer 110 to perform at least some of the operations described with reference to one or more of FIGS. 5-10. In various aspects, persistent memory 118 also stores phrases selected by the users for storage in the extended reality world 120 by the users' respective avatars. In some aspects, persistent memory 118 may also store training data for one or more of the machine learning modules described herein.

The communications network 130 provides communication links between the server computer 110 and each of the computing devices 101-103. The communications network 130 can be any suitable one or more communication networks including, for example, the Internet, a wide area network (WAN), a metropolitan area network (MAN), a wireless local area network (WLAN), a personal area network (PAN) such as Bluetooth®, a portion of the Public Switched Telephone Network (PSTN), a cellular telephone network, a radio access network (RAN) such as a Fifth Generation (5G) New Radio (NR) system, an Ethernet network, a cable network, a satellite network, or any combination thereof. In other implementations, the computing devices 101-103 may communicate with the extended reality world 120 over a dedicated communication link (not shown for simplicity). In some other implementations, the computing devices 101-103 may communicate with the extended reality world 120 independently of the server computer 110.

Figure 2:
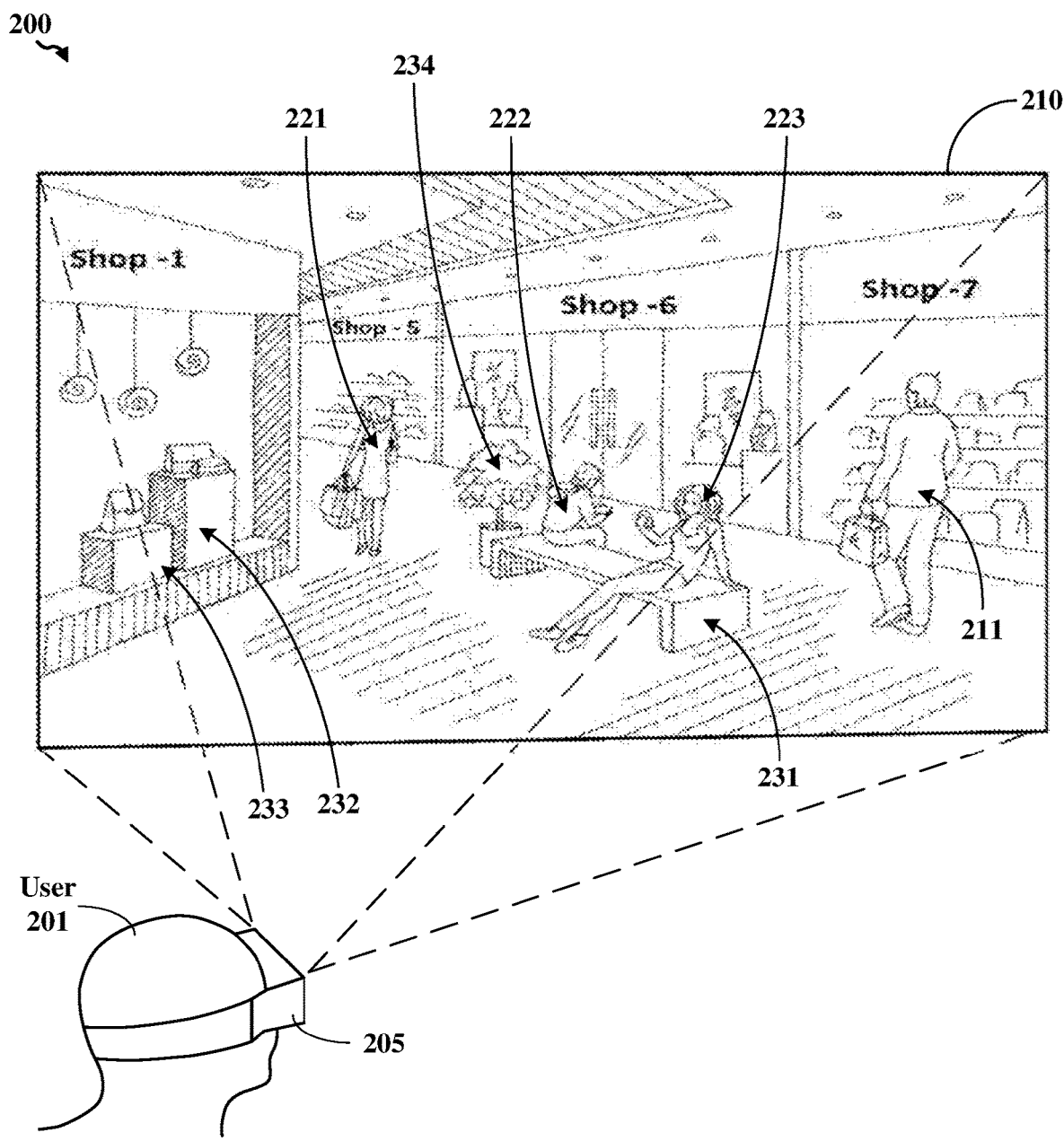
FIG. 2 shows an example extended reality world within which various aspects of the subject matter disclosed herein can be implemented.

FIG. 2 shows an example presentation 200 of an extended reality world 210 within which various aspects of the subject matter disclosed herein can be implemented. In the example of FIG. 2, the presentation 200 is displayed to a user 201 via an associated a headset 205, and the user 201 is associated with the first computing device 101 of FIG. 1. The headset 205 can be any suitable AR, VR, or MR headset such as (but not limited to) Facebook's Oculus, Samsung's Gear, Google's Cardboard, or Apple's VisionPro, among other examples. In other implementations, user 201 may employ a display screen, such as a TV or computer monitor, to view the presentation 200 of the extended reality world provided by the server computer 110.

Example presentation 200 is shown to include an avatar 211 associated with the user 201, other avatars 221-223 associated with other users, and at least four virtual objects 231-234. User 201 can control the movements, actions, and other activities of the avatar 211 while concurrently viewing the avatar 211 perform these movements, actions, and other activities within the extended reality world using the headset 205. More specifically, the headset 205 can generate avatar control signals based on various physical commands, audio commands, visual commands, and/or other commands received from the user 201 and can transmit the resulting avatar control signals over the communications network 130 to the server computer 110. The server computer 110 receives the avatar control signals and renders or displays the avatar 211 performing the corresponding movements, actions, and other activities within the presentation 200 of the extended reality world. The other avatars 221-223 can be controlled by the other respective users in a similar manner.

Physical commands may include (but not limited to) gestures, movements, and sequences of gestures or movements, among other examples. In some aspects, the headset 205 can cause the avatar 211 displayed in the extended reality world to mirror or mimic the movements and actions of the user 201 in the physical world. For example, when the user 201 kneels in the physical world, the headset 205 can instruct the server computer 110 to display the avatar kneeling in the extended reality world; when the user 201 moves an object in the physical world, the headset 205 can instruct the server computer 110 to display the avatar 211 moving a corresponding virtual object in the extended reality world; when the user 201 writes (or pretends to write) the phrase on an object in the physical world, the headset 205 can instruct the server computer 110 to display the avatar 211 writing a phrase on a corresponding virtual object in the extended reality world; and so on.

In other implementations, user 201 can employ one or more other user interfaces to generate at least some of the avatar control signals in response to the physical commands. In some aspects, a motion detector, video camera, or other suitable device can be used to monitor and interpret physical commands provided by user 201. For example, a video camera can detect user 201 making a certain gesture or sequence of gestures and generate avatar control signals that cause the user's avatar 211 to perform one or more corresponding movements, actions, and other activities.

The audio commands may include words, sentences, phrases, abbreviations, acronyms, and the like spoken by the user 201. In some instances, the headset 205 may include or be associated with voice recognition software that can generate avatar control signals based on commands spoken by the user 201. For example, when user 201 says "turn right," the headset 205 may generate avatar control signals that instruct the server computer 110 to display the avatar 211 turning right. In some aspects, the audio commands may also include other sounds such as, for example, code words, whistles, sighs, or laughs, among other examples. For example, when the user 201 whistles in a certain manner, the headset 205 may generate avatar control signals that instruct the server computer 110 to display the avatar 211 performing some corresponding movement or action. The visual commands may include (but not limited to) eye-tracking and gaze-tracking devices, and can be used to control any suitable movement, action, or activity by the avatar 211.

The virtual objects displayed within the presentation 200, including virtual objects 231-234, can be rendered or displayed for the user 201 by the extended reality model 116B in conjunction with the client program described above. As discussed, virtual objects can be created or modified by user 201, by one or more other users, by the extended reality model 116B, or by a third party. For purposes of discussion herein, the first virtual object 231 is a bench upon which other avatars 222 and 223 are displayed sitting, the second virtual object 232 is a relatively short display case for merchandise, the third virtual object 233 is a relatively tall display case for merchandise, and the fourth virtual object 234 is a plant positioned next to the bench embodied by the first virtual object 231. In some aspects, the server computer 110 can transmit a data stream over the communications network 130 to the computing device 101 based on the location and orientation of the avatar 211, for example, such that the computing device 101 displays the presentation 200 of the extended reality world 210 as seen by the avatar 211.

Figure 3A:
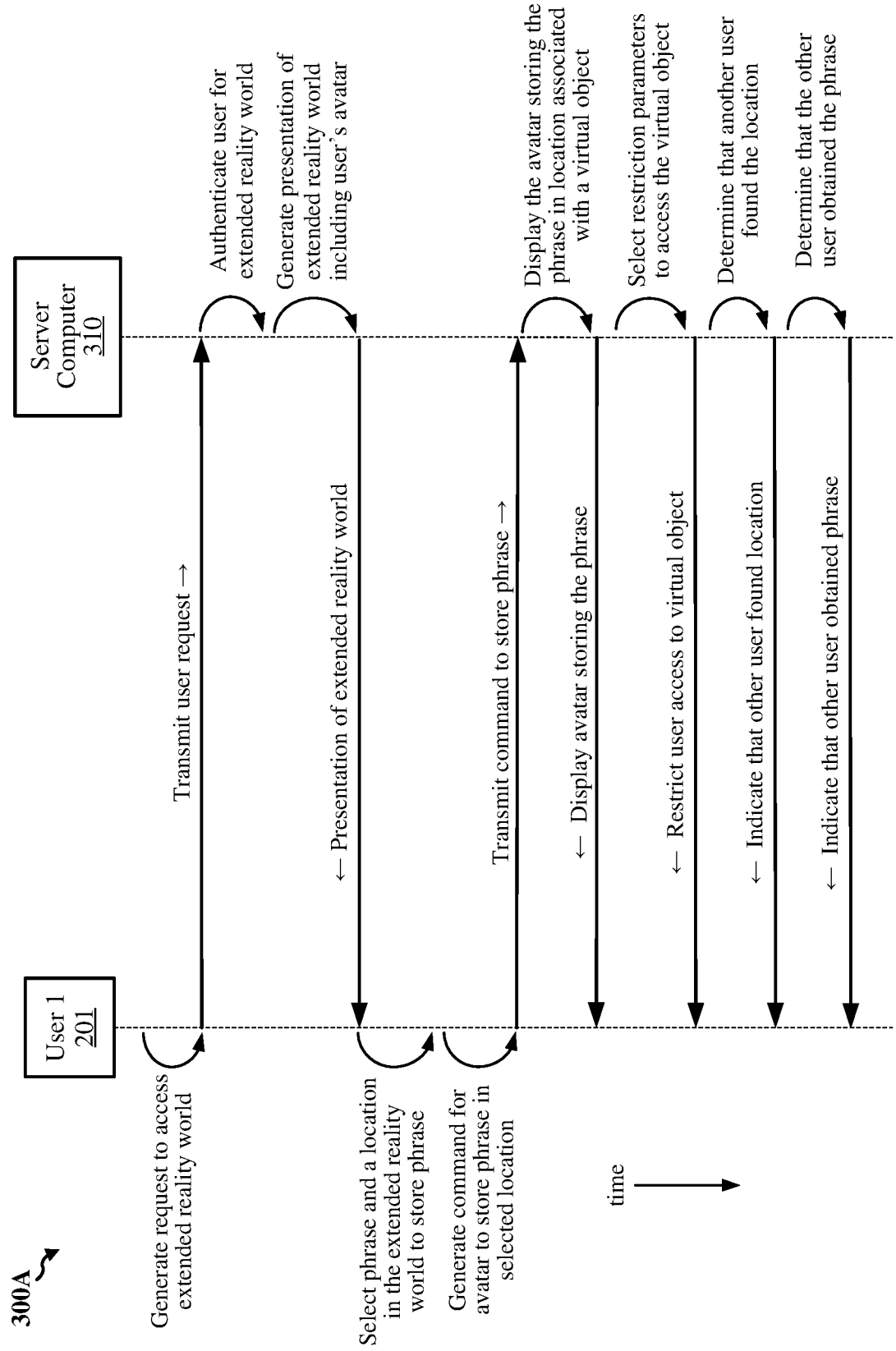
FIG. 3A shows a sequence diagram depicting an example operation for storing a user's phrase at a virtual location within an extended reality world, according to some implementations.

FIG. 3A shows a sequence diagram depicting an example operation 300A for storing a phrase in an extended reality world, according to some implementations. The operation 300A may be performed between user 201 and a server computer 310 and described with respect to the extended reality world 120 of FIG. 1. User 201 can access and participate in the extended reality world 120 using the computing device 101 of FIG. 1, and the server computer 310 can host or can be associated with the extended reality world 120. In some implementations, the extended reality world 120 may be an online game and the user's avatar may be a player in the online game. In some aspects, the online game may be a publicly available online game such as Fortnite or Minecraft, among other examples.

The operation 300A begins with user 201 using the computing device 101 to generate a request to access the extended reality world 120. The computing device 101 sends the request as a first transmission over the communications network 130 to the server computer 310. The server computer 310 receives the first transmission, decodes the request, and authenticates the user 201 for an extended reality world session. The server computer 110 generates a presentation of the extended reality world 120 that includes at least the avatar associated with user 201. The server computer 310 transmits the presentation of the extended reality world 120 over the communications network 130 to computing device 101, which displays the presentation for viewing by user 201 on the headset 205 of FIG. 2, a display screen associated with computing device 101, or another suitable user interface described above with respect to FIG. 1. The presentation can include the user's avatar, other avatars associated with other users, one or more virtual objects associated with the extended reality world 120, and/or other features. In some aspects, the presentation can be the presentation 200 described with respect to FIG. 2.

User 201 selects a phrase and a location or place within the extended reality world 120 at which to store the selected phrase. User 201 can use the headset 205 and/or another suitable user interface (such as a keyboard) to provide the selected phrase and the selected location to computing device 101 for transmission to the server computer 310 over the communications network 130. In some instances, the selected location or place may be associated with a virtual object displayed in the presentation of the extended reality world 120. As discussed, the phrase can be any suitable sequence of letters, numbers, and/or special characters capable of entry using the headset 205 or other suitable user interface associated with computing device 101. For example, in some instances, the phrase may include one or more of a username, a password, an access code, an encryption key, a decryption key, a digital currency key, a favorite word, or a favorite phrase. In other instances, the phrase may be a recovery phrase associated with a cryptocurrency or digital ID wallet, for example, which includes a plurality of words arranged in a predetermined order and spelled based on respective predefined spellings.

User 201 provides, to the computing device 101, one or more commands instructing the user's avatar to store the selected phrase at the selected location in the extended reality world 120. The selected location can be associated with a virtual object displayed in the extended reality world 120. In some aspects, user 201 selects or indicates the virtual object via computing device 101. In other aspects, the server computer 310 selects or indicates the virtual object. User 201 can provide the commands to the computing device 101 using any combination of the aforementioned user interfaces including, for example, the headset 205. Also, as discussed with respect to FIG. 2, user 201 can use various physical commands, audio commands, visual commands, and/or other commands that instruct the server computer 310 to display or otherwise indicate the user's avatar storing the selected phrase at the selected location within the extended reality world 120.

The computing device 101 transmits, over the communications network 130 to the server computer 310, the commands provided by user 201. The server computer 310 receives the commands and displays, within the presentation of the extended reality world 120, the user's avatar navigating through the extended reality world 120, arriving at the selected location, and storing the selected phrase associated with user 201. In some aspects, the server computer 310 can render a video stream depicting the user's avatar performing the commanded actions and then render or insert the video stream into the presentation of the extended reality world 120, for example, so that the presentation viewed by user 201 displays the avatar navigating through the extended reality world 120, arriving at the selected location, and storing the selected phrase within the extended reality world. Any of the various physical commands, audio commands, visual commands, and/or other commands described above can be used to instruct the user's avatar. In various aspects, the commands may include a sequence of commands entered by user 201 and transmitted to the server computer 310 over a time period. For example, in some aspects, user 201 may send a plurality of commands to the server computer 310, at a corresponding plurality of times, to navigate the avatar through the extended reality world 120 until the avatar arrives at the selected location and/or the associated virtual object.

In some instances, user 201 can instruct the avatar to write or indicate the selected phrase in a virtual note and then place the virtual note within an interior area or volume of a virtual object within the extended reality world. In response thereto, the server computer 310 displays, within the presentation of the extended reality world, the user's avatar navigating through the extended reality world 120, arriving at the virtual object, and placing a virtual note indicating the selected phrase within an interior area or volume of the virtual object. In other instances, user 201 can instruct the avatar to write, draw, or mark the phrase on one or more surfaces of the virtual object. In response thereto, the server computer 310 displays, within the presentation of the extended reality world, the avatar writing, drawing, or marking the phrase on corresponding surfaces of the virtual object. In some other instances, user 201 can instruct the avatar to store the phrase on top of, underneath, behind, or within a certain distance and/or direction of the virtual object. In response thereto, the server computer 310 displays, within the presentation of the extended reality world, the avatar storing the phrase on top of, underneath, behind, or within the certain distance and/or direction of the virtual object.

The server computer 310 can restrict user access to the virtual object (and therefore restrict access to the phrase) based on one or more restriction parameters. In some instances, the one or more restriction parameters may include one or more of a gesture, a song, a phrase, a sound, a movement, or a sequence of actions. In various aspects, the server computer 310 may prompt a user to provide input (such as a gesture, a song, a phrase, a sound, a movement, or a sequence of actions) in response to the user's avatar locating the virtual object within the extended reality world. The server computer 310 may grant the user access to the virtual object if the user provides the correct input, and the server computer 310 may deny access if the user does not provide the correct input. For example, if a "thumbs up" gesture is designated as the access gesture, then only users whose avatars locate the virtual object and who provide the "thumbs up" gesture can access the virtual object. For another example, if the song "Wish You Were Here" is designated as the access song, then only users whose avatars locate the virtual object and who sing or hum the song "Wish You Were Here" can access the virtual object. In other instances, the one or more restriction parameters may require that a first user have a certain number of personal attributes in common with a second user who stored the phrase in the extended reality world. For example, in some aspects, the server computer 310 may compare a plurality of personal attributes of the second user with corresponding personal attributes of the first user and grant the first user access to the virtual object only if the number of shared personal attributes exceeds a threshold value.

The server computer 310 can restrict user access to the virtual note based on a predetermined manner of unfolding or unlocking the virtual note. In some instances, the user's avatar may fold the virtual note one or more times and then place the folded virtual note within an interior area or volume of the virtual object. Thereafter, the server computer 310 may require a respective user's avatar to unfold the virtual note in the reverse order in which it was folded prior to being placed within the virtual object. Thus, if the respective user's avatar unfolds the virtual note in the correct order, the server computer 110 grants the respective user (via the avatar) access to the virtual object. Otherwise, the server computer 110 denies user access to the virtual object.

The server computer 310 may determine that another user has found the location at which the phrase is stored and may transmit, over the communications network 130 to user 201, an indication that the other user found the location at which the phrase is stored. The server computer 310 may also determine that that the other user has retrieved the phrase from the location associated with the virtual object and may transmit, over the communications network 130 to user 201, an indication that the other user retrieved the phrase from the location associated with the virtual object.

Figure 3B:
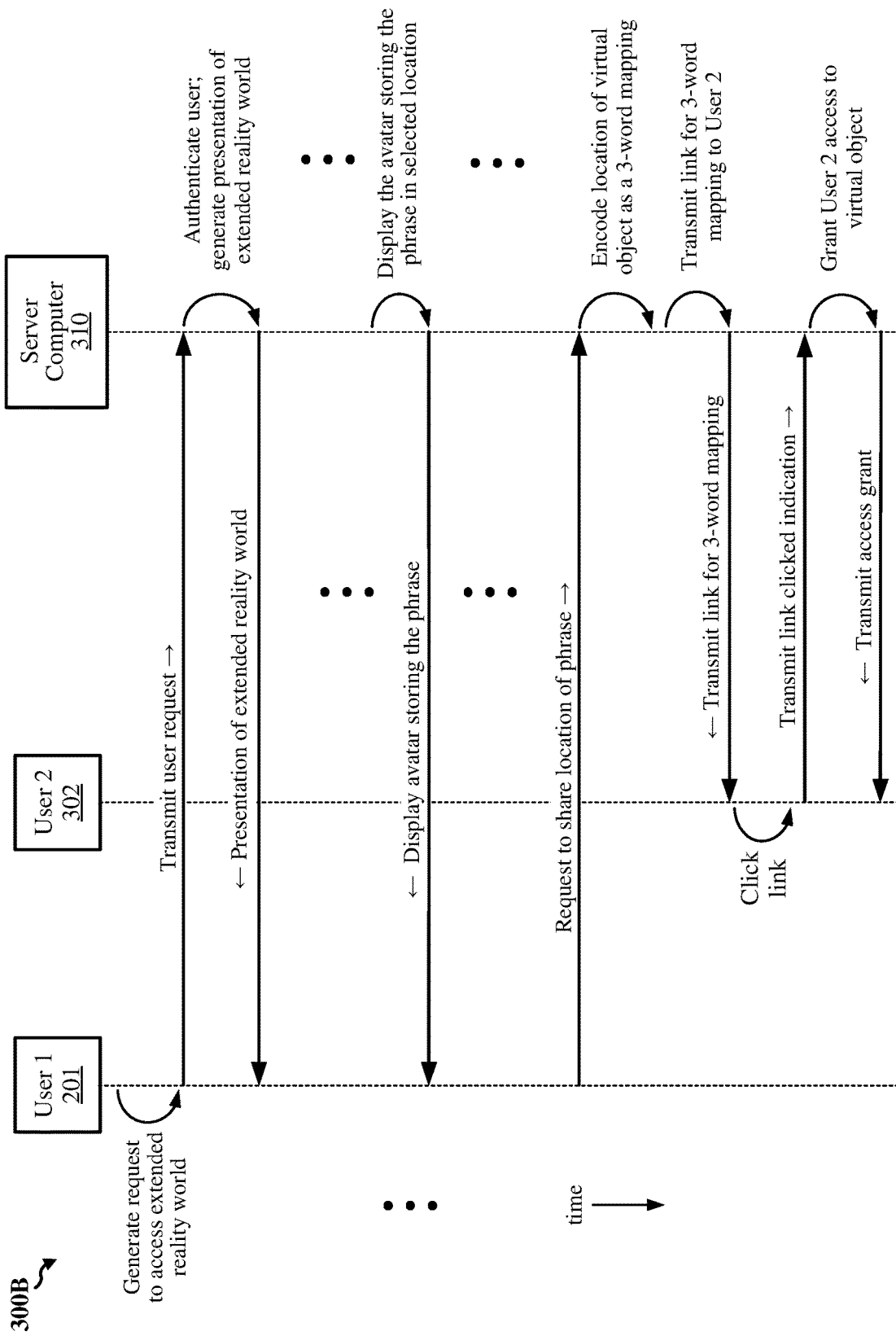
FIG. 3B shows a sequence diagram depicting an example operation for sharing the virtual location at which a user's phrase is stored within an extended reality world, according to some implementations.

FIG. 3B shows a sequence diagram depicting an example operation 300B for sharing a virtual location at which the phrase is stored in an extended reality world, according to some implementations. The operation 300B may be performed between user 201 (also referred to as the first user 201), a second user 302, and a server computer 310 associated with an extended reality world. In some implementations, the first user 201 is associated with computing device 101 of FIG. 1, the second user 302 is associated with computing device 102, the server computer 310 is one example of the server computer 110 of FIG. 1, and the extended reality system is one example of the extended reality system 120 of FIG. 1. Thus, the first user 201 can use computing device 101 to login to, access, and navigate throughout the extended reality world 120 via the server computer 310 over the communications network 130, and the second user 302 can use computing device 102 to login to, access, and navigate throughout the extended reality world 120 via the server computer 310 over the communications network 130. As discussed, the extended reality world 120 can be hosted by the server computer 310 or by a third-party, and in some instances can be an online game.

Operation 300B begins with the first user 201 using the computing device 101 to generate a request to access the extended reality world 120 and transmit the request to the server computer 310 as a first transmission over the communications network 130. The server computer 310 receives the first transmission from the first user 201 and transmits a presentation of the extended reality world 120 over the communications network 130 to computing device 101. The computing device 101 displays the presentation of the extended reality world 120 to the first user 201 via a display screen, headset, or other suitable user interface. The operation 300B continues in a manner similar to the example operation 300A of FIG. 3A until after the server computer 310 displays, within the presentation of the extended reality world 120, the avatar storing the phrase in the location selected by the first user 201.

After the first user's avatar stores the phrase in the selected location, the first user 201 sends a request, over the communications network 130 to the server computer 310, to share the location of the stored phrase within the extended reality world 120 with a second user 302. The server computer 310 receives the request and determines the location of the virtual object within the extended reality world 120. The server computer 310 encodes the location as a 3-word mapping and transmits a link to the 3-word mapping over the communication network 130 to the computing device 102 associated with the second user 302. In some instances, the 3-word mapping may be encoded as one or more "What 3 words" that indicate the location of the virtual object, and thus the place or location within the extended reality world 120 at which the phrase is stored. In other instances, the location within the extended reality world 120 at which the phrase is stored can be encoded using some other suitable location encoding technique.

The computing device 102 displays or otherwise presents the link to the second user 302 on a display, headset, or other suitable user interface associated with the computing device 102. The second user 302 clicks on the link, and the computing device 102 transmits an indication of the activated link over the communications network 130 to the server computer 310. The server computer 310 receives the indication and grants the second user 302 access to the virtual object within the extended reality world 120 identified by the 3-word mapping. In some instances, the server computer 310 may allow the second user 302 to access the virtual object, and thereafter obtain the stored phrase, based at least in part on profile information for the second user 302. In other instances, the server computer 310 may grant the second user 302 access to the virtual object based at least in part on credentials of the second user 302.

Figure 4A:
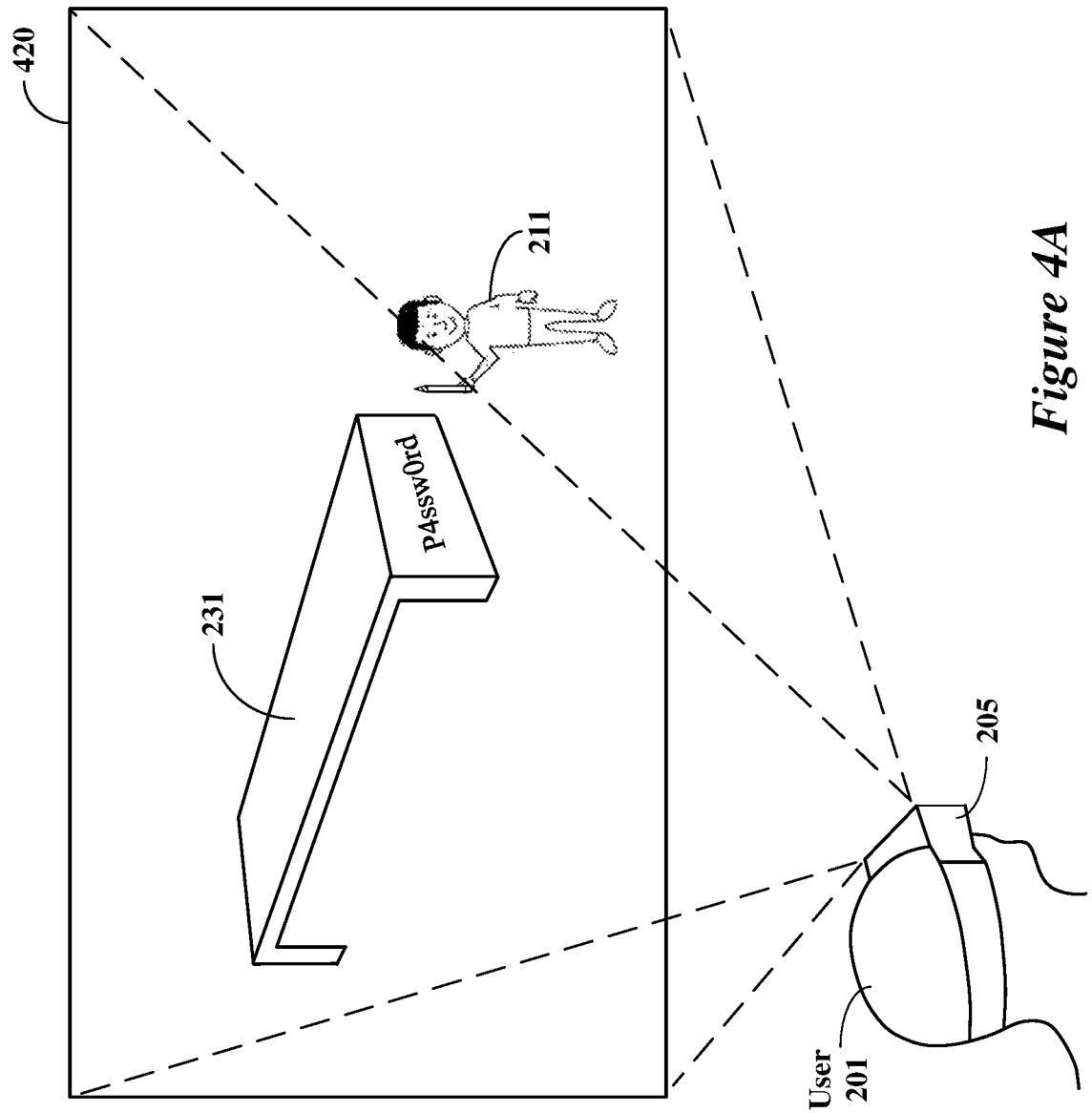
FIG. 4A shows an example presentation of an extended reality world within which a user's avatar is displayed writing a selected phrase on a virtual object within the extended reality world.

FIG. 4A shows an example presentation 400A of an extended reality world 420 within which a user's avatar is displayed writing the phrase on a surface of a virtual object within the extended reality world. In the example of FIG. 4A, the presentation 400A is displayed to user 201 via the headset 205, and the user 201 is associated with the first computing device 101 of FIG. 1. As discussed, the headset 205 can be any suitable AR, VR, or MR headset such as (but not limited to) Facebook's Oculus, Samsung's Gear, Google's Cardboard, or Apple's VisionPro, among other examples. In other implementations, user 201 may employ a display screen, such as a TV or computer monitor, to view the presentation 400A of the extended reality world 420.

The example presentation 400A is shown to include the user's avatar 211 and a virtual object 231 (depicted as a bench) within the extended reality world 420. As described, the server computer 110 can generate presentation 400A of the extended reality world 420 and transmit the presentation 400A, including the user's avatar 211 and the virtual object 231, to the computing device 101 associated with user 201. In the example of FIG. 4A, user 201 selects "P4ssw0rd" as the phrase to store and selects a location within the extended reality world 420 at which to store the phrase. The selected location may be associated with virtual object 231 (e.g., the bench). User 201 provides commands for the avatar 211 to write, draw, or mark the selected phrase on one or more surfaces of the virtual object 231. In some instances, user 201 may also provide commands for the avatar 211 to travel through the extended reality world 120 along a certain path to locate and arrive at the virtual object 231. User 201 may use any of the various physical commands, audio commands, visual commands, and/or other commands to generate control signals for the avatar 211.

The computing device 101 transmits the user commands over the communications network 130 to the server computer 110. In response thereto, the server computer 110 displays, within the presentation of the extended reality world, the user's avatar 211 traveling through the extended reality world 120 along a selected path to the virtual object 231 (traveling not shown in the example of FIG. 4A for simplicity). Then, as depicted in FIG. 4A, the server computer 110 displays the user's avatar 211 writing, drawing, or marking the selected phrase on at least one surface of the virtual object 231. In other instances, user 201 may instruct avatar 211 to store the phrase on top of, underneath, behind, or within a certain distance and/or direction of the virtual object 231.

In some instances, the client program associated with computing device 101 can render the avatar 211 in the presentation 400A of extended reality world 120, and can also work in conjunction with the user interface to allow user 201 to control or manipulate various movements, actions, and other activities of the avatar 211. In some aspects, the client program can construct a presentation of the extended reality world 120 based on data extracted from transmissions by the server computer 110 over the communications network 130. The client program can display the user's avatar within the constructed presentation of the extended reality world 120 and can maneuver the avatar and cause the avatar to perform actions (such as storing a phrase at a selected location within the extended reality world 120) based on control signals and/or commands provided by the user via one or more user interfaces. In other instances, the server computer 110 can generate a video stream depicting the avatar 211 traveling through the extended reality world 120, arriving at the virtual object 231, and writing the selected phrase on the virtual object 231. The video stream can be overlaid, synchronized, or otherwise combined with the presentation of the extended reality world 120.

Figure 4B:
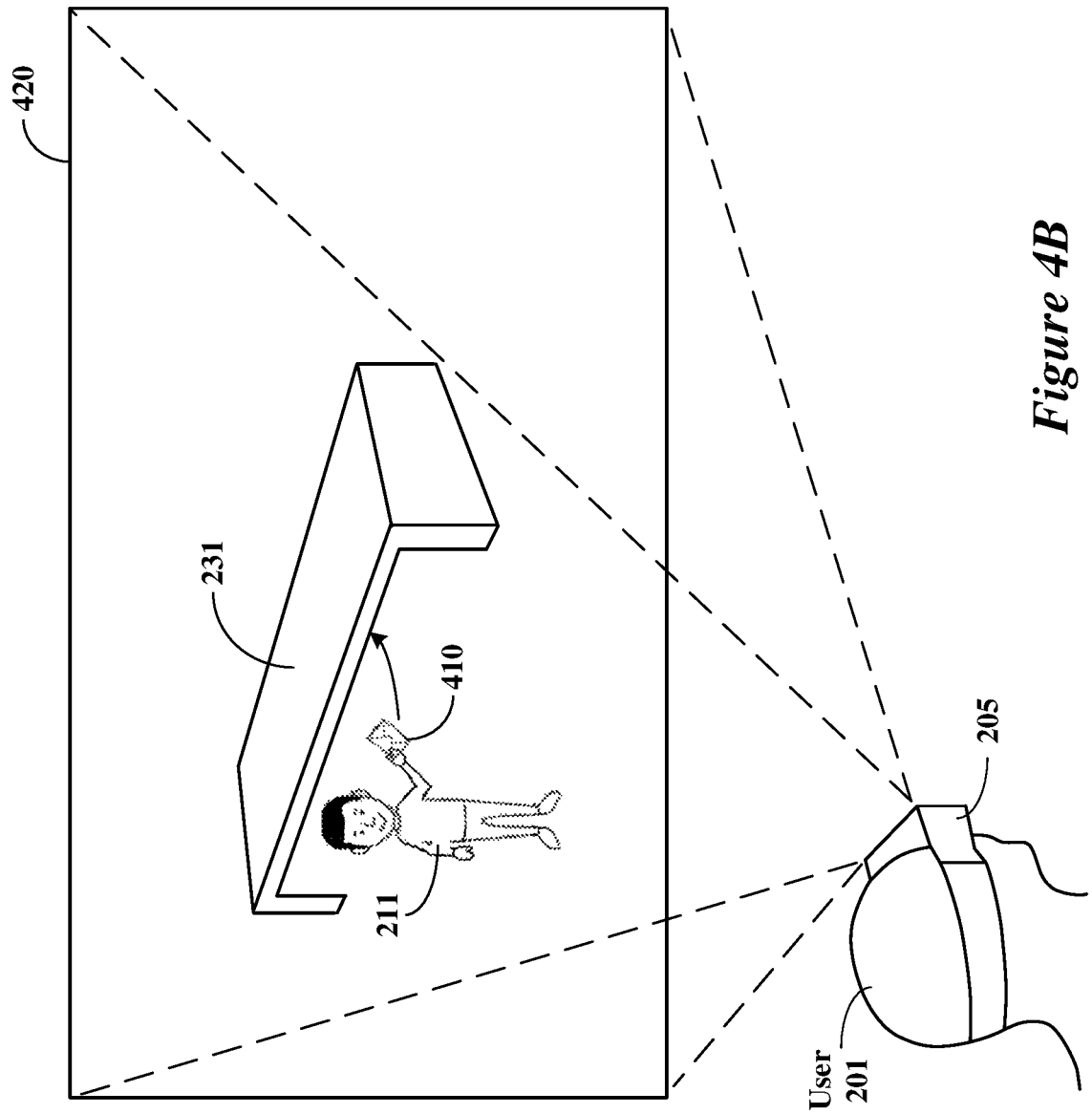
FIG. 4B shows another example presentation of an extended reality world within which a user's avatar is displayed placing a virtual note indicating the phrase in conjunction with a virtual object within the extended reality world.

FIG. 4B shows another example presentation 400B of an extended reality world within which a user's avatar is displayed storing a virtual note indicating the phrase inside a virtual object within the extended reality world. In the example of FIG. 4B, the presentation 400B is displayed to user 201 via the headset 205, and the user 201 is associated with the first computing device 101 of FIG. 1. As discussed, the headset 205 can be any suitable AR, VR, or MR headset such as (but not limited to) Facebook's Oculus, Samsung's Gear, Google's Cardboard, or Apple's VisionPro, among other examples. In other implementations, user 201 may employ a display screen, such as a TV or computer monitor, to view the presentation 400B of the extended reality world 420.

The example presentation 400B is shown to include the user's avatar 211 and the virtual object 231 (e.g., a bench) within the extended reality world 420. As described, the server computer 110 can generate the presentation 400B of the extended reality world 420 and transmit the presentation 400B, including the user's avatar 211 and the virtual object 231, to the computing device 101 associated with user 201. In the example of FIG. 4B, user 201 selects "P4ssw0rd" as the phrase and selects a location associated with the virtual object 231 at which to store or place the virtual note indicating the selected phrase. User 201 provides commands for the avatar 211 to locate the selected location, write the selected phrase on a virtual note 410, and store or place the virtual note 410 at or near the virtual object 231. In some instances, user 201 may also provide commands for the avatar 211 to travel through the extended reality world 120 along a certain path to locate and arrive at the virtual object 231. User 201 may use any of the various physical commands, audio commands, visual commands, and/or other commands to generate avatar control signals.

The computing device 101 transmits the user commands over the communications network 130 to the server computer 110, which in response thereto displays the user's avatar 211 traveling through the extended reality world 120 along the selected path to the virtual object 231 and then writing the selected phrase "P4ssw0rd" on the virtual note 231 (traveling not shown in the example of FIG. 4A for simplicity). Then, as depicted in the example of FIG. 4B, the server computer 110 displays the user's avatar 211 placing the virtual note 431 within an interior volume or area of the virtual object 231.

In some instances, the client program associated with computing device 101 can render the avatar 211 in the presentation 400B of extended reality world 120, and can also work in conjunction with the user interface to allow user 201 to control or manipulate various movements, actions, and other activities of the avatar 211. In some aspects, the client program can construct a presentation of the extended reality world 120 based on data extracted from transmissions by the server computer 110 over the communications network 130. The client program can display the user's avatar within the constructed presentation of the extended reality world 120 and can maneuver the avatar and cause the avatar to perform actions (such as storing a phrase at a selected location within the extended reality world 120) based on control signals and/or commands provided by the user via one or more user interfaces. In other instances, the server computer 110 can generate a video stream depicting the avatar 211 traveling through the extended reality world 120, arriving at the virtual object 231, writing the selected phrase on the virtual note 410, and then placing the virtual note 431 within the virtual object 231. The video stream can be overlaid, synchronized, or otherwise combined with the presentation of the extended reality world 120.

Figure 5:
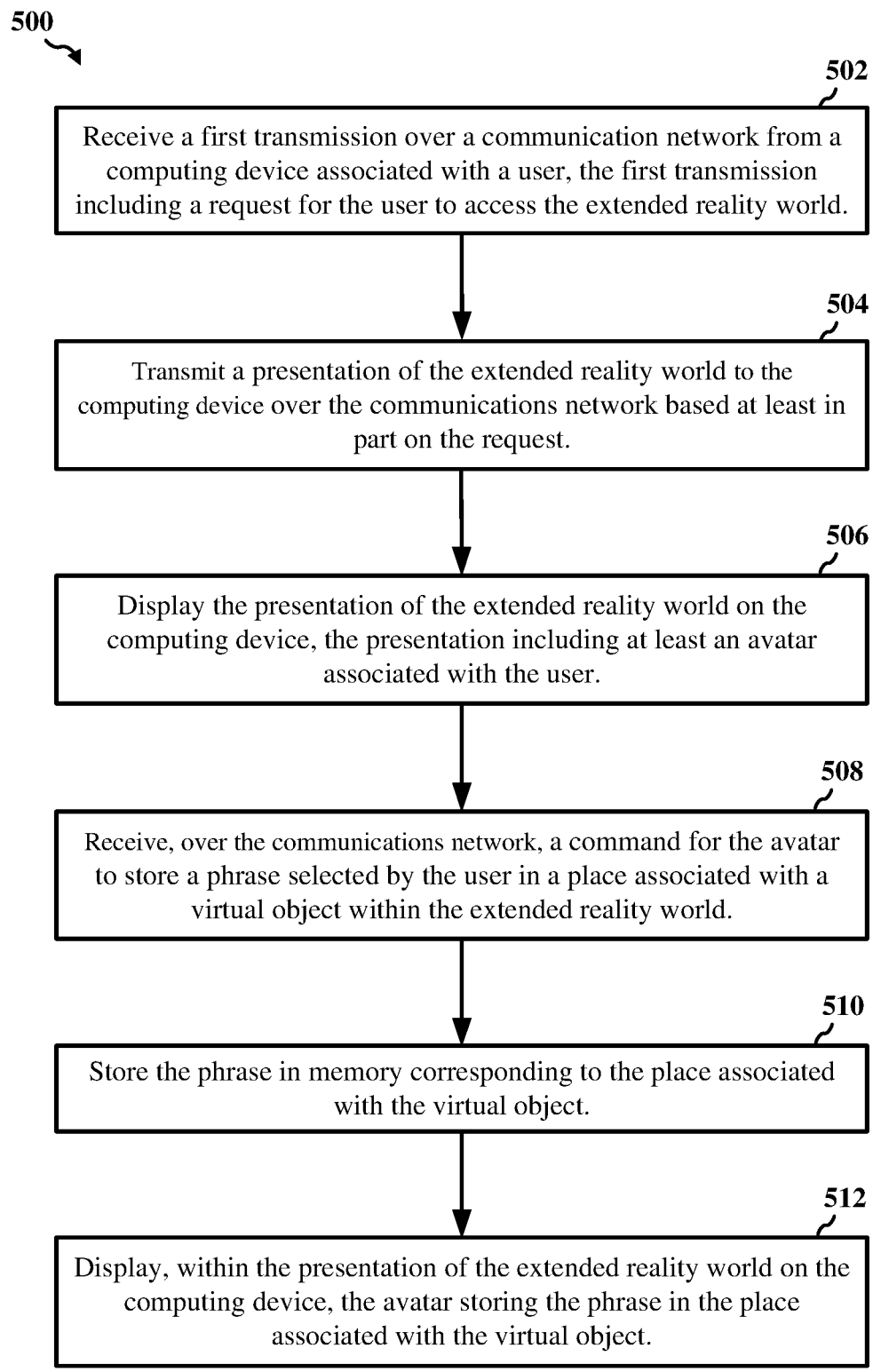
FIG. 5 shows an illustrative flowchart depicting an example operation for storing a phrase in an extended reality world, according to some implementations.

FIG. 5 shows an illustrative flowchart depicting an example operation 500 for storing a phrase in an extended reality world, according to some implementations. Operation 500 may be performed by one or more processors of a server computer hosting or associated with the extended reality world. In some implementations, operation 500 may be performed by the server computer 110 of FIG. 1. For example, at 502, the server computer 110 receives a first transmission over a communication network from a computing device associated with a user, the first transmission including a request for the user to access the extended reality world. At 504, the server computer 110 transmits a presentation of the extended reality world to the computing device over the communications network based at least in part on the request. At 506, the server computer 110 displays the presentation of the extended reality world on the computing device, the presentation including at least an avatar associated with the user. At 508, the server computer 110 receives, over the communications network, a command for the avatar to store a phrase selected by the user in a place associated with a virtual object within the extended reality world displays the presentation of the extended reality world. At 510, the server computer 110 stores the phrase in memory corresponding to the place associated with the virtual object. At 512, the server computer 110 displays, within the presentation of the extended reality world on the computing device, the avatar storing the phrase in the place associated with the virtual object. In some instances, the avatar storing the phrase in the place associated with the virtual object is not visible to other users of the extended reality world, for example, by cloaking the avatar or otherwise making the avatar invisible to other users. In some aspects, the extended reality world may be associated with an online game, and the avatar may be a player that is admitted to the online game and controlled by the user. In other aspects, the extended reality world may be a dedicated extended reality world managed or operated by a third party. In some other aspects, the extended reality world may be a proprietary extended reality world managed or operated by the user.

In various implementations, the computing device associated with the user may include a display screen, an audio interface, and one or more user interfaces such as (but not limited to) a keyboard, a mouse, a trackpad, motion detectors, an extended reality headset, an augmented reality headset, a digital assistant, or a haptic interface. In some instances, the phrase includes one or more of a username, a password, an access code, an encryption key, a decryption key, a digital currency key, a favorite word, or a favorite phrase. In other instances, the phrase is a recovery phrase associated with a cryptocurrency or digital identification (ID) wallet, the recovery phrase including a plurality of words arranged in a predetermined order, each word spelled based on a respective predefined spelling.

Figure 6:
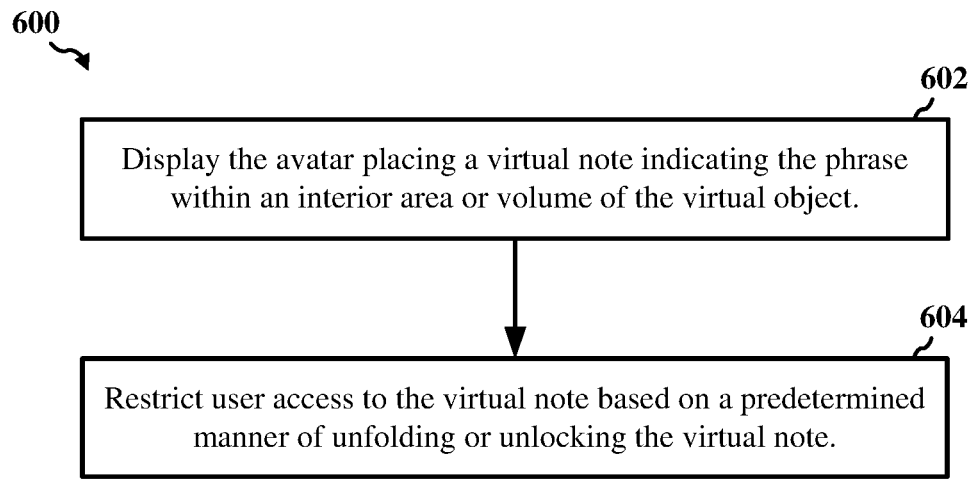
FIG. 6 shows an illustrative flowchart depicting an example operation for restricting access to at least a portion of an extended reality world, according to some implementations.

FIG. 6 shows an illustrative flowchart depicting another example operation 600 for restricting access to at least a portion of an extended reality world, according to some implementations. The operation 600 may be performed by one or more processors of a server computer hosting or associated with the extended reality world such as, for example, the server computer 110 of FIG. 1. In some instances, operation 600 may be performed after the operation 500 described above with respect to FIG. 5. For example, at 602, the server computer 110 displays the avatar placing a virtual note indicating the phrase within an interior area or volume of the virtual object. At 604, the server computer 110 restricts user access to the virtual note based on a predetermined manner of unfolding or unlocking the virtual note.

Figure 7:
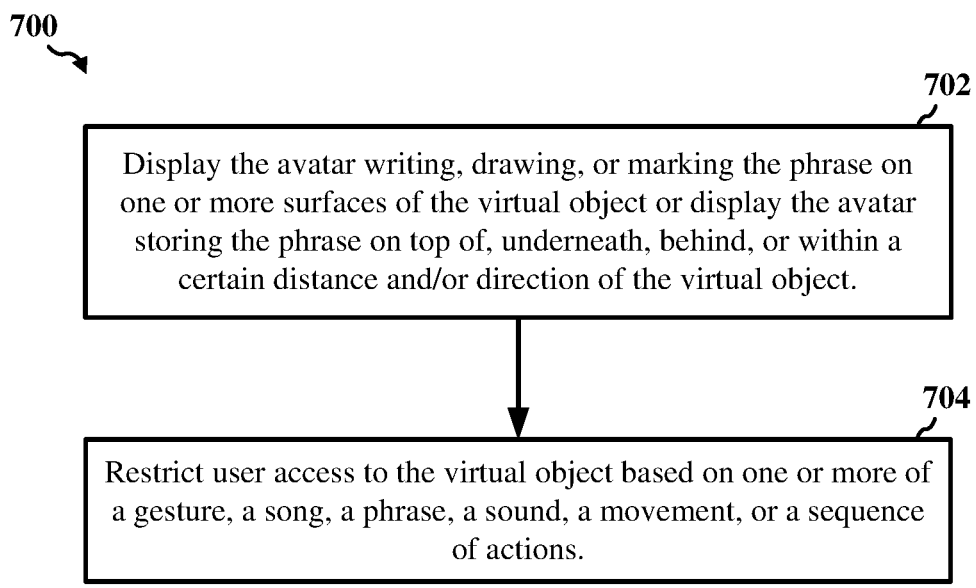
FIG. 7 shows an illustrative flowchart depicting another example operation for restricting access to at least a portion of an extended reality world, according to some implementations.

FIG. 7 shows an illustrative flowchart depicting another example operation 700 for restricting access to at least a portion of an extended reality world, according to some implementations. Operation 700 may be performed by a server computer hosting the extended reality world such as, for example, the server computer 110 described with respect to FIG. 1. In some instances, operation 700 may be performed after the example operation 500 of FIG. 5. For example, at 702, the server computer 110 displays the avatar writing, drawing, or marking the phrase on one or more surfaces of the virtual object or displays the avatar storing the phrase on top of, underneath, behind, or within a certain distance and/or direction of the virtual object. At 704, the server computer 110 restricts user access to the virtual object based on one or more of a gesture, a song, a phrase, a sound, a movement, or a sequence of actions.

Figure 8:
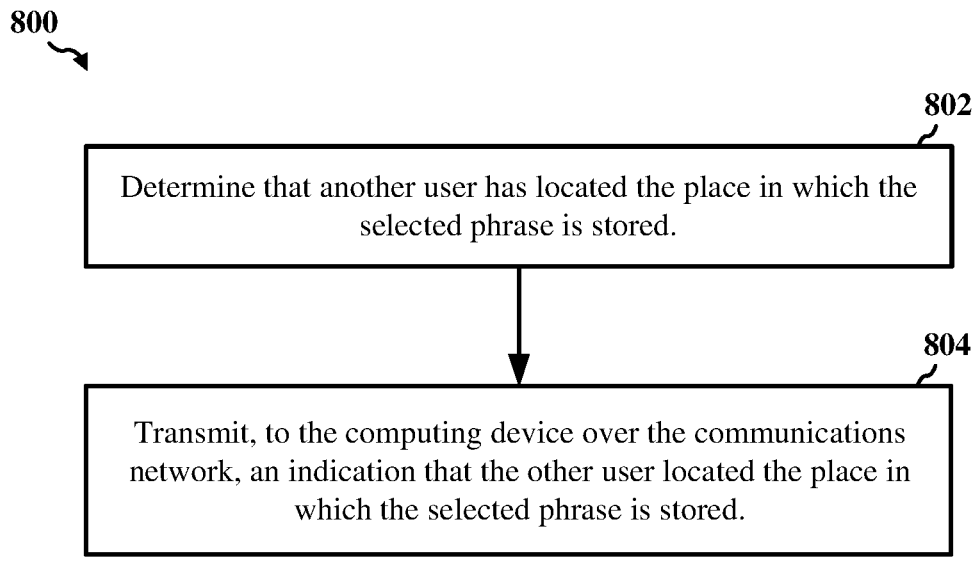
FIG. 8 shows an illustrative flowchart depicting an example operation for providing indications to the user of an extended reality world, according to some implementations.

FIG. 8 shows an illustrative flowchart depicting an example operation 800 for providing indications to the user of an extended reality world, according to some implementations. Operation 800 may be performed by one or more processors of a server computer hosting or associated with the extended reality world such as, for example, the server computer 110 of FIG. 1. In some instances, operation 800 may be performed after the operation 500 described above with respect to FIG. 5. For example, at 802, the server computer 110 determines that another user has located the place in which the selected phrase is stored. At 804, the server computer 110 transmits, to the computing device over the communications network, an indication that the other user located the place in which the selected phrase is stored. In this way, implementations of the subject matter disclosed herein can be used to immediately notify a user that another user has learned of the location in the extended reality world at which the user's selected phrase is stored.

Figure 9:
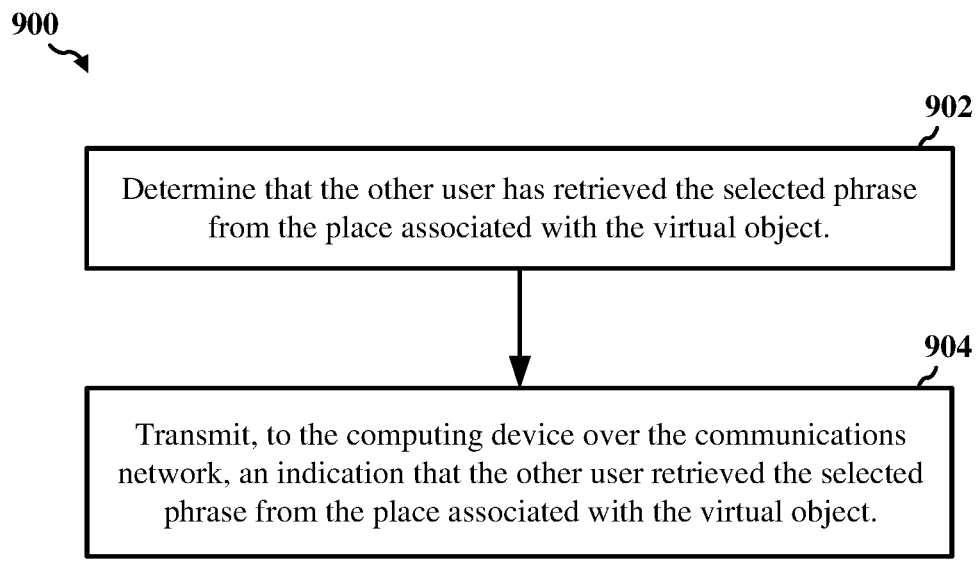
FIG. 9 shows an illustrative flowchart depicting another example operation for providing indications to the user of an extended reality world, according to some implementations.

FIG. 9 shows an illustrative flowchart depicting another example operation 900 for providing indications to the user of an extended reality world, according to some implementations. Operation 900 may be performed by one or more processors of a server computer hosting or associated with the extended reality world such as, for example, the server computer 110 of FIG. 1. In some instances, operation 900 may be performed after the operation 500 described above with respect to FIG. 5. For example, at 902, the server computer 110 determines that another user has retrieved the selected phrase from the place associated with the virtual object. At 904, the server computer 110 transmits, to the computing device over the communications network, an indication that the other user retrieved the selected phrase from the place associated with the virtual object. In this way, implementations of the subject matter disclosed herein can be used to immediately notify a user that another user has, without authorization, obtained the user's phrase from the selected location in the extended reality world.

Figure 10:
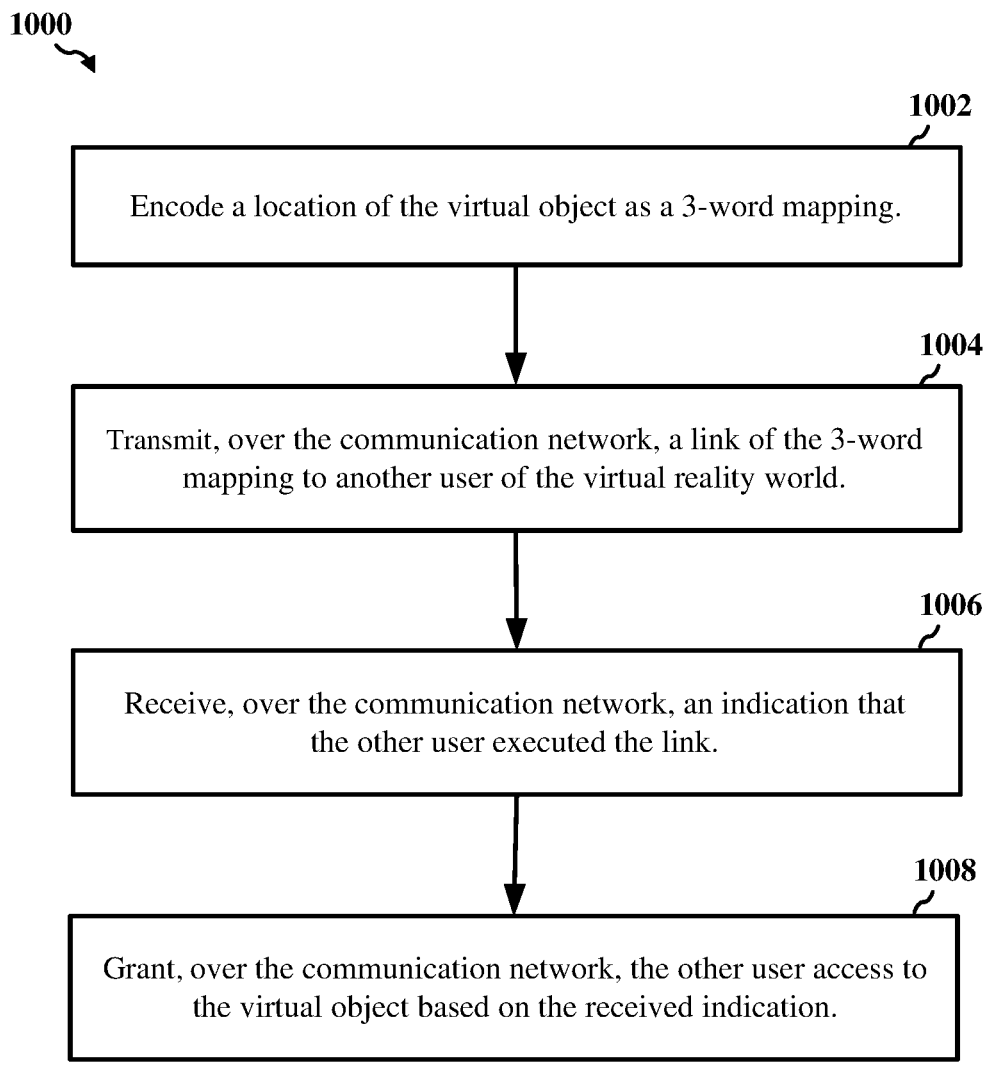
FIG. 10 shows an illustrative flowchart depicting another example operation for encoding a location of a phrase stored in an extended reality world, according to some implementations.

FIG. 10 shows an illustrative flowchart depicting another example operation 1000 for encoding a location of a phrase hidden in an extended reality world, according to some implementations. Operation 1000 may be performed by one or more processors of a server computer hosting or associated with the extended reality world. In some instances, operation 1000 may be performed after the operation 500 described above with respect to FIG. 5. For example, at 1002, the server computer 110 encodes a location of the virtual object as a 3-word mapping. At 1004, the server computer transmits, over the communication network, a link of the 3-word mapping to another user of the virtual reality world. At 1006, the server computer receives, over the communication network, an indication that the other user executed the link. At 1008, the server computer 110 grants, over the communication network, the other user access to the virtual object based on the received indication.

As used herein, a phrase referring to "at least one of" a list of items refers to any combination of those items, including single members. As an example, "at least one of: a, b, or c" is intended to cover: a, b, c, a-b, a-c, b-c, and a-b-c.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various illustrative logics, logical blocks, modules, circuits, and algorithm processes described in connection with the implementations disclosed herein may be implemented as electronic hardware, computer software, or combinations of both. The interchangeability of hardware and software has been described, in terms of functionality, and illustrated in the various illustrative components, blocks, modules, circuits and processes described above. Whether such functionality is implemented in hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method comprising:
    receiving, by a server computer associated with an extended reality world, a first transmission over a communication network from a computing device associated with a user, the first transmission including a request for the user to access the extended reality world;
    transmitting, from the server computer to the computing device over the communications network, a presentation of the extended reality world based at least in part on the request;
    displaying the presentation of the extended reality world on the computing device, the presentation including at least an avatar associated with the user;
    receiving, by the server computer from the computing device over the communication network, a command for the avatar to store a phrase selected by the user in a place associated with a virtual object within the extended reality world;
    storing the phrase in memory corresponding to the place associated with the virtual object; and
    displaying, within the presentation of the extended reality world on the computing device, the avatar storing the phrase in the place associated with the virtual object by:
        displaying the avatar placing a virtual note indicating the phrase within an interior area or volume of the virtual object;
        displaying the avatar writing, drawing, or marking the phrase on one or more surfaces of the virtual object; or
        displaying the avatar storing the phrase on top of, underneath, behind, within a certain distance of the virtual object, or within a certain direction of the virtual object.

2. The method of claim 1, wherein the phrase comprises one or more of a username, a password, an access code, an encryption key, a decryption key, a digital currency key, a favorite word, or a favorite phrase.

3. The method of claim 1, wherein the phrase is a recovery phrase associated with a cryptocurrency or digital identification (ID) wallet, the recovery phrase including a plurality of words arranged in a predetermined order, each word spelled based on a respective predefined spelling.

4. The method of claim 1, wherein the extended reality world comprises an online game, and the avatar comprises a player that is admitted to the online game and that is controlled by the user.

5. The method of claim 1, wherein the avatar storing the phrase in the place associated with the virtual object is not visible to other users of the extended reality world.

6. The method of claim 1, further comprising:
    restricting user access to the virtual note based on a predetermined manner of unfolding or unlocking the virtual note.

7. The method of claim 1, further comprising:
    restricting user access to the virtual object based on one or more of a gesture, a song, a phrase, a sound, a movement, or a sequence of actions.

8. The method of claim 1, further comprising:
    determining that another user has located the place in which the selected phrase is stored; and
    transmitting, from the server computer to the computing device over the communications network, an indication that the other user located the place in which the selected phrase is stored.

9. The method of claim 8, further comprising:
    determining that the other user has retrieved the selected phrase from the place associated with the virtual object; and
    transmitting, from the server computer to the computing device over the communications network, an indication that the other user retrieved the selected phrase from the place associated with the virtual object.

10. The method of claim 1, further comprising:
    encoding, by the server computer, a location of the virtual object as a 3-word mapping;
    transmitting, from the server computer over the communication network, a link of the 3-word mapping to another user of the virtual reality world;
    receiving, by the server computer over the communication network, an indication that the other user executed the link; and
    granting, by the server computer over the communication network, the other user access to the virtual object based on the received indication.

11. A server computer associated with an extended reality world, the server computer comprising:
    one or more processors; and
    a memory communicatively coupled with the one or more processors and storing instructions that, when executed by the one or more processors, causes the system to:

receive a first transmission over a communication network from a computing device associated with a user, the first transmission including a request for the user to access the extended reality world;

transmit, to the computing device over the communications network, a presentation of the extended reality world based at least in part the request;

display the presentation of the extended reality world on the computing device, the presentation including at least an avatar associated with the user;

receive, from the computing device over the communication network, a command for the avatar to store a phrase selected by the user in a virtual object within the extended reality world;

store the phrase in memory corresponding to the place associated with the virtual object; and display, within the presentation of the extended reality world on the computing device, the avatar storing the phrase in the place associated with the virtual object by;

displaying the avatar placing a virtual note indicating the phrase within an interior area or volume of the virtual object:

displaying the avatar writing, drawing, or marking the phrase on one or more surfaces of the virtual object; or displaying the avatar storing the phrase on top of, underneath, behind, within a certain distance of the virtual object, or within a certain direction of the virtual object.

12. The server computer of claim 11, wherein the phrase is a recovery phrase associated with a cryptocurrency or digital identification (ID) wallet, the recovery phrase including a plurality of words arranged in a predetermined order, each word spelled based on a respective predefined spelling.

13. The server computer of claim 11, wherein execution of the instructions further causes the server computer to:

restrict user access to the virtual note based on a predetermined manner of unfolding or unlocking the virtual note.

14. The server computer of claim 11, wherein execution of the instructions further causes the server computer to:

restrict user access to the virtual object based on one or more of a gesture, a song, a phrase, a sound, a movement, or a sequence of actions.

15. The server computer of claim 11, wherein execution of the instructions further causes the server computer to:

determine that another user has located the place in which the selected phrase is stored; and transmit, to the computing device over the communications network, an indication that the other user located the place in which the selected phrase is stored.

16. The server computer of claim 15, wherein execution of the instructions further causes the server computer to:

determine that the other user has retrieved the selected phrase from the place associated with the virtual object; and transmit, to the computing device over the communications network, an indication that the other user retrieved the selected phrase from the place associated with the virtual object.

\* \* \* \* \*